US011474015B2

(12) United States Patent
Amamiya et al.

(10) Patent No.: US 11,474,015 B2
(45) Date of Patent: Oct. 18, 2022

(54) VISCOSITY MEASUREMENT UNIT AND VISCOMETER

(71) Applicant: ATAGO CO., LTD., Tokyo (JP)

(72) Inventors: Hideyuki Amamiya, Tokyo (JP); Yoshinori Nakashima, Tokyo (JP); Keiji Kawada, Tokyo (JP); Toshio Kasai, Tokyo (JP)

(73) Assignee: ATAGO CO., LTD., Tokyo (JP)

( * ) Notice: Subject to any disclaimer, the term of this patent is extended or adjusted under 35 U.S.C. 154(b) by 0 days.

(21) Appl. No.: 17/258,882

(22) PCT Filed: Jul. 11, 2019

(86) PCT No.: PCT/JP2019/027486
§ 371 (c)(1),
(2) Date: Jan. 8, 2021

(87) PCT Pub. No.: WO2020/013273
PCT Pub. Date: Jan. 16, 2020

(65) Prior Publication Data
US 2021/0293684 A1 Sep. 23, 2021

(30) Foreign Application Priority Data
Jul. 11, 2018 (JP) .............................. JP2018-131568

(51) Int. Cl.
*G01N 11/14* (2006.01)
*G01N 11/00* (2006.01)
(52) U.S. Cl.
CPC .... *G01N 11/142* (2013.01); *G01N 2011/0006* (2013.01)

(58) Field of Classification Search
CPC ...................... G01N 11/142; G01N 2011/0006
(Continued)

(56) References Cited

U.S. PATENT DOCUMENTS

| 4,622,846 A | 11/1986 | Moon, Jr. et al. |
| 5,103,679 A | 4/1992 | Porter et al. |
| 8,820,145 B2 * | 9/2014 | Luo .................. G01N 11/14 |
| | | 73/54.31 |

FOREIGN PATENT DOCUMENTS

| CN | 101936868 B | 9/2012 |
| JP | 61-132840 A | 6/1986 |

(Continued)

OTHER PUBLICATIONS

International Search Report for PCT/JP2019/027486 dated Oct. 8, 2019 [PCT/ISA/210].

(Continued)

*Primary Examiner* — Robert R Raevis
(74) *Attorney, Agent, or Firm* — Sughrue Mion, PLLC

(57) ABSTRACT

A viscosity measurement unit includes a first stage having a first surface, a second stage having a second surface and configured to rotate with the second surface which is opposed and in proximity to the first surface, a motor including a motor body and a shaft that is an output shaft of the motor body and configured to rotate synchronously with the second stage, a fixed member arranged to rotatably support the shaft and the motor body, and a strain gauge unit fixed to the fixed member and configured to be biased by a contact of the motor body when the motor body rotates in a first direction with respect to the fixed member.

3 Claims, 13 Drawing Sheets

(58) Field of Classification Search
USPC .............................................. 73/54.28–54.35
See application file for complete search history.

(56) References Cited

FOREIGN PATENT DOCUMENTS

| | | | |
|---|---|---|---|
| JP | 01-038520 | Y2 | 11/1989 |
| JP | 07-035671 | A | 2/1995 |
| JP | 07-040202 | Y2 | 9/1995 |
| JP | 09-126981 | A | 5/1997 |
| JP | 10-206252 | A | 8/1998 |
| JP | 2001-272323 | A | 10/2001 |
| JP | 2002-340768 | A | 11/2002 |
| JP | 3503341 | B2 | 3/2004 |
| WO | 03/044489 | * | 5/2003 |

OTHER PUBLICATIONS

Written Opinion for PCT/JP2019/027486 dated Oct. 8, 2019 [PCT/ISA/237].
Extended European Search Report dated Feb. 17, 2022 from the European Patent Office in EP Application No. 19834300.6.

* cited by examiner

FIG. 12

<STARTUP CONDITION TABLE TBa>

| TYPE OF SAMLE | LUBRICANT A (NEWTONIAN FLUID) | |
|---|---|---|
| VISCOSITY P | STARTUP CONDITION Pt | REFERENCE MEASUREMENT VOLTAGE (V2a) |
| P1 | Pt1 | V2a1 |
| P2 | Pt1 | V2a2 |
| P3 | Pt1 | V2a3 |
| P4 | Pt2 | V2a4 |
| ⋮ | ⋮ | ⋮ |
| $P_{n-2}$ | $Pt_{(m-1)}$ | $V2a_{(n-2)}$ |
| $P_{n-1}$ | $Pt_m$ | $V2a_{(n-1)}$ |
| $P_n$ | $Pt_m$ | $V2a_n$ |

VISCOSITY MEASUREMENT UNIT AND VISCOMETER

CROSS REFERENCE TO RELATED APPLICATIONS

This application is a National Stage of International Application No. PCT/JP2019/027486 filed Jul. 11, 2019, claiming priority based on Japanese Patent Application No. 2018-131568 filed Jul. 11, 2018.

TECHNICAL FIELD

The present disclosure relates to a viscosity measurement unit and a viscometer.

RERATED ART

Rotational viscometers are known that measure viscosity of a sample in a liquid state, for example, according to an equilibrium position between a reactive torque applied to a rotor rotating in the sample and a torsional reactive force of a spring with one end fixed to a rotor shaft. Patent Document 1 discloses the related technique.

CITATION LIST

Patent Literature

Patent Document 1: Japanese Unexamined Patent Application Publication No. H09-126981

SUMMARY OF INVENTION

Technical Problem

Conventional rotational viscometers typically need about several tens of seconds to one minute from the start of rotation of the rotor until the equilibrium position becomes stable and allows the measurement. This period of time causes an increase in temperature of the sample due to friction between the rotating rotor and the sample. The increase in temperature impedes the accurate measurement of the viscosity that greatly depends on the temperature in the conventional rotational viscometers, and should be improved so as to measure the viscosity with a higher accuracy. An improvement in accuracy of the measurement and a reduction in time for the measurement are required to improve the efficiency in sample-manufacturing facilities that need to deal with a large number of samples to measure the viscosity in a short time.

In view of the foregoing problem, the present disclosure provides a viscosity measurement unit and a viscometer capable of measuring viscosity with a high accuracy in a short time.

Technical Solution

A viscosity measurement unit according to one embodiment includes a first stage having a first surface, a second stage having a second surface and configured to rotate the second surface with the second surface being opposed and in proximity to the first surface, a motor including a motor body and a shaft that is an output shaft of the motor body configured to rotate synchronously with the second stage, a fixed member arranged to rotatably support the shaft and the motor body, and a strain gauge unit fixed to the fixed member and configured to be biased by a contact of the motor body when the motor body rotates in a first direction with respect to the fixed member.

A viscometer according to another embodiment includes a viscosity measurement unit including a first stage having a first surface, a second stage having a second surface and configured to rotate the second surface with the second surface being opposed and in proximity to the first surface, a motor including a motor body and a shaft that is an output shaft of the motor body and is directly or indirectly connected to the second stage to rotate synchronously with the second stage, a fixed member arranged to rotatably support the shaft and the motor body, and a strain gauge unit fixed to the fixed member and configured to be biased by a contact of the motor body when the motor body rotates in a first direction with respect to the fixed member, and a controller configured to control an operation of the motor and obtain viscosity in accordance with an output voltage from the strain gauge unit.

The viscometer may include a casing provided to support the fixed member and house the controller, and a cap removably attached to the fixed member to cover the second surface in an attached state and cause the second surface to be exposed in a removed state. The casing may be holdable. The viscometer may further include a memory configured to store a relationship of correspondence between the output voltage and the viscosity, in which, the controller may be configured to, in response to a startup command being externally input in a state in which a sample of which the viscosity is measured is held between the first surface and the second surface, start driving the motor to rotate in a second direction opposite to the first direction, detect the output voltage from the strain gauge unit obtained in a state in which the motor body rotates in the first direction due to reactive torque derived from viscosity of the sample and comes into contact to bias the strain gauge unit, and obtain the viscosity corresponding to the detected output voltage in accordance with the relationship of correspondence.

Advantageous Effects

The viscosity measurement unit and the viscometer can measure the viscosity with a high accuracy in a short time.

BRIEF DESCRIPTION OF DRAWINGS

FIG. 12 is a diagram illustrating a startup condition table TBa used during the measurement operation of the viscometer 51.

DESCRIPTION OF EMBODIMENTS

Figure 1:
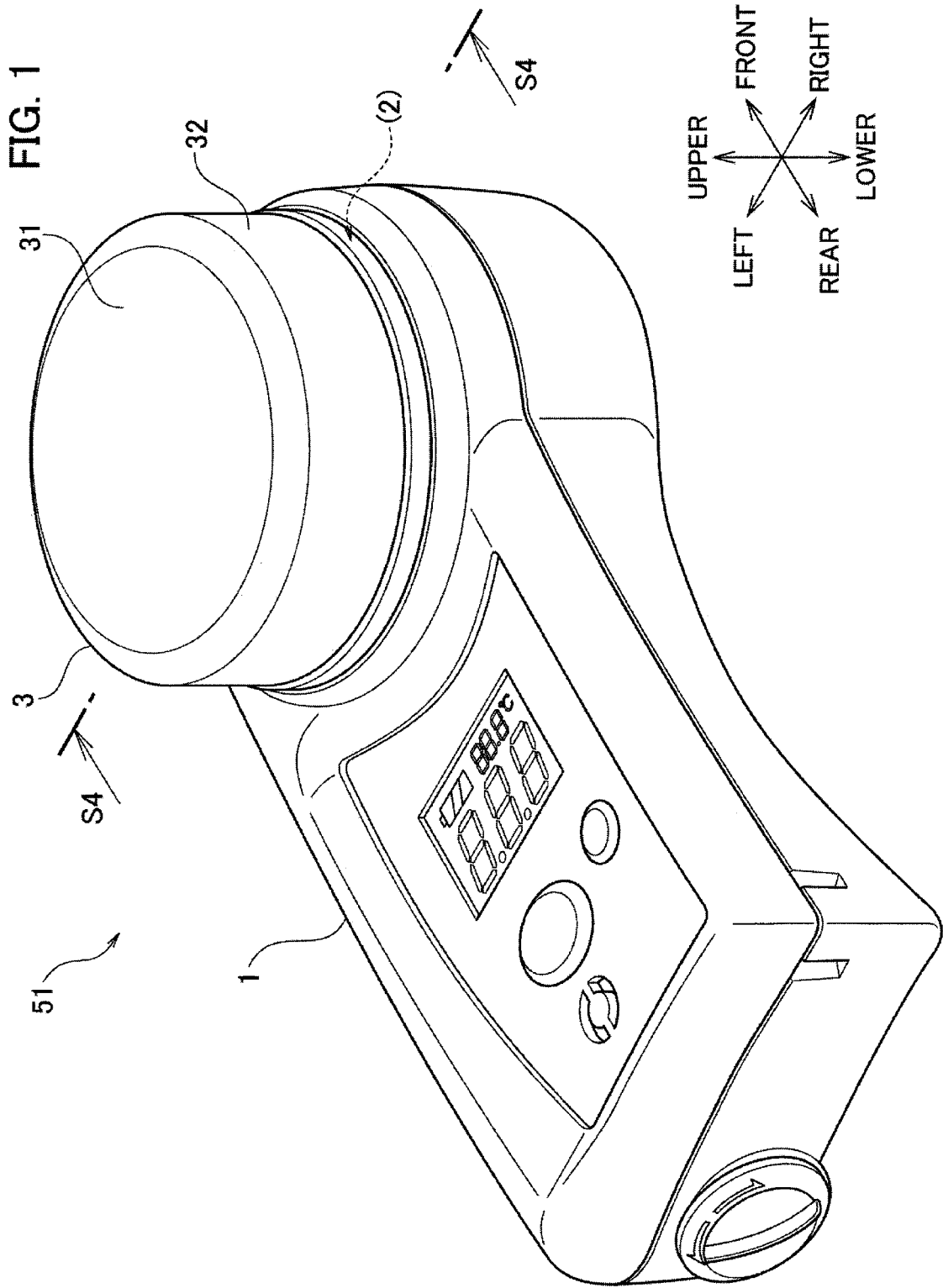
FIG. 1 is an external perspective view of a viscometer according to one or more embodiments.

A viscometer according to one or more embodiments is described below with reference to the drawings. An external configuration of the viscometer is first described mainly with reference to FIG. 1 and FIG. 2. The upper, lower, right, left, front, and rear directions are defined by the arrows shown in FIG. 1 and FIG. 2 for illustration purposes. FIG. 1 is a perspective view of the viscometer 51 according to one embodiment illustrating a state in which a measurement cap 3 is attached, the measurement cap 3 being used when in storage and during a measurement, and FIG. 2 is a perspective view illustrating a state in which the measurement cap 3 is removed from the viscometer 51 illustrated in FIG. 1.

The viscometer 51 includes a body 1 which is thin in the upper-lower direction and elongated in the front-rear direction in appearance to allow a user to hold by the hand. The body 1 is provided on the front side with a stage 2 projecting upward and formed into a substantially columnar shape. The measurement cap 3 is removably attached to the stage 2. The attachment structure is a bayonet mount, for example.

The measurement cap 3 has a flat-bottom pot-like shape including a circular flat bottom 31 and a circumferential wall 32 orthogonally extending from the circumference of the flat bottom 31. The flat bottom 31 is provided with a cap stage 33 (refer to FIG. 4) projecting in the same direction as that of the circumferential wall 32 and formed into a columnar shape.

Figure 2:
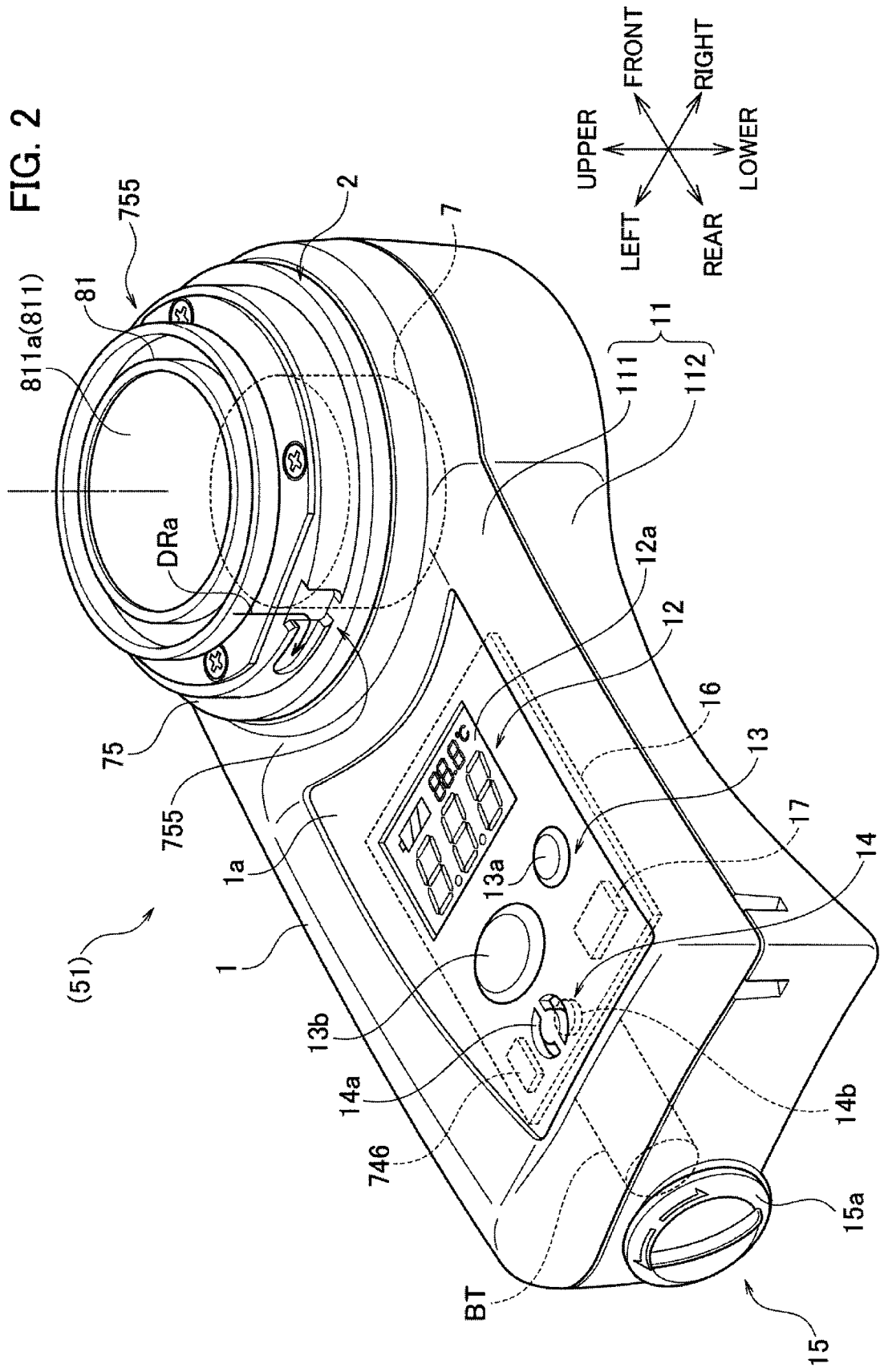
FIG. 2 is an external perspective view of the viscometer 51 illustrated in FIG. 1 with a measurement cap 3 removed.

As illustrated in FIG. 2, the stage 2 is provided with cap engagement parts 755 to be engaged with claws (not illustrated) provided on the inner surface of the circumferential wall 32 of the measurement cap 3. The measurement cap 3 is to be attached to the stage 2 such that the measurement cap 3 is pushed downward while the claws and the cap engagement parts 755 are aligned in the circumferential direction and is then rotated in the circumferential direction, as indicated by the arrow DRa in FIG. 2.

The measurement cap 3 covers a measurement stage 81 in the attached state illustrated in FIG. 1. The disk-shaped measurement stage 81 is exposed when the measurement cap 3 in the measurement state is removed, as illustrated in FIG. 2. A sample mount 811 of the measurement stage 81 has a sample mount surface 811a which is horizontal in a state in which the body 1 is placed on the horizontal surface with the bottom surface in contact therewith.

The body 1 includes a casing 11 provided with an upper case 111 on the upper side and a lower case 112 on the lower side attached together in the upper-lower direction. FIG. 2 illustrates the top surface 1a of the body 1 provided with a display 12, an operation part 13, and a temperature detection part 14. A board 16 is housed inside the casing 11.

Figure 3:
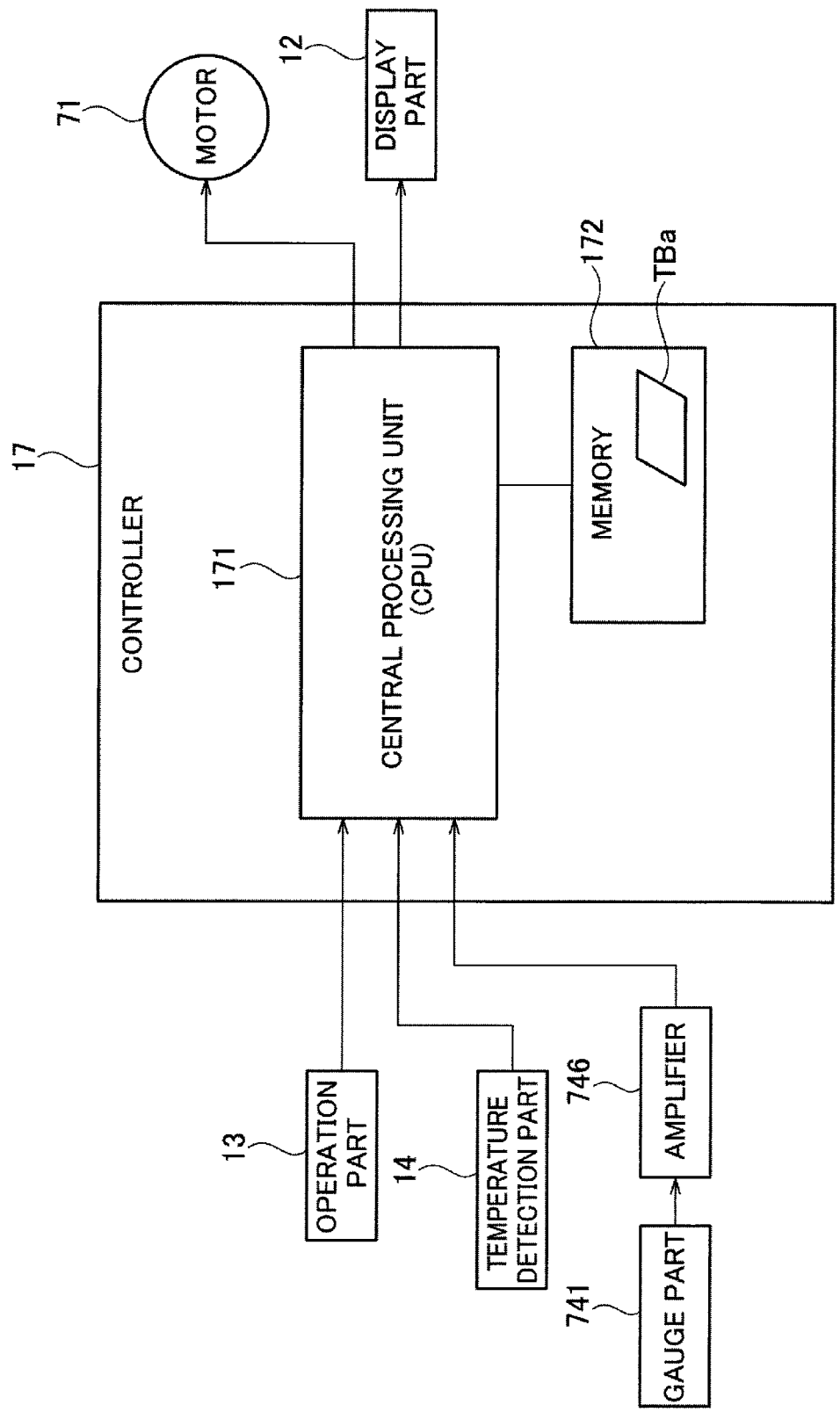
FIG. 3 is a block diagram illustrating a functional configuration of the viscometer 51.

FIG. 3 is a block diagram illustrating a functional configuration of the viscometer 51, which is also described below with reference to FIG. 3. The display 12 includes a display element 12a mounted on the board 16. The display element 12a displays pieces of information such as an operating state of the viscometer 51 and a value of viscosity measured so as to allow the user to visually recognize the information. The operation part 13 includes a plurality of push buttons mounted on the board 16 so that the user executes the operations of turning ON/OFF of a power supply and starting the measurement. FIG. 2 illustrates a power supply button 13a and a measurement start button 13b. The temperature detection part 14 includes a port 14a provided on the upper case 111, and a temperature sensor 14b mounted on the board 16 at a position corresponding to the port 14a. The temperature sensor 14b measures an ambient temperature around the body 1. The body 1 is provided inside with a battery housing part 15 for housing a battery BT such as a dry cell. The lower case 112 is provided on the rear surface with a cap 15a openable and covering the battery housing part 15 to allow the battery BT to be replaced. A controller 17 including a central processing unit (CPU) 171 and a memory 172 is mounted on the board 16.

The measurer who uses the viscometer 51 can generally measure the viscosity of a sample through the following process. The measurer first removes the measurement cap 3 and places the viscometer 51 on the horizontal surface such as a table with the bottom surface of the body 1 facing down. The measurer pushes the power supply button 13a to turn on the viscometer 51. The measurer puts a suitable amount of the sample on the sample mount surface 811a of the sample mount 811 of the measurement stage 81 which is exposed. The suitable amount is about 0.3 ml, for example. The measurer then attaches the measurement cap 3 to the stage 2 and pushes the measurement start button 13b. The pushing the measurement start button 13b causes the viscometer 51 to start the measurement. The controller 17 of the viscometer 51 obtains the viscosity of the sample by a predetermined method (described below) and displays the numerical value of the viscosity obtained on the display 12. The time required for the measurement from the push of the measurement start button 13b to the display of the numerical value of the viscosity is about one second.

Figure 4:
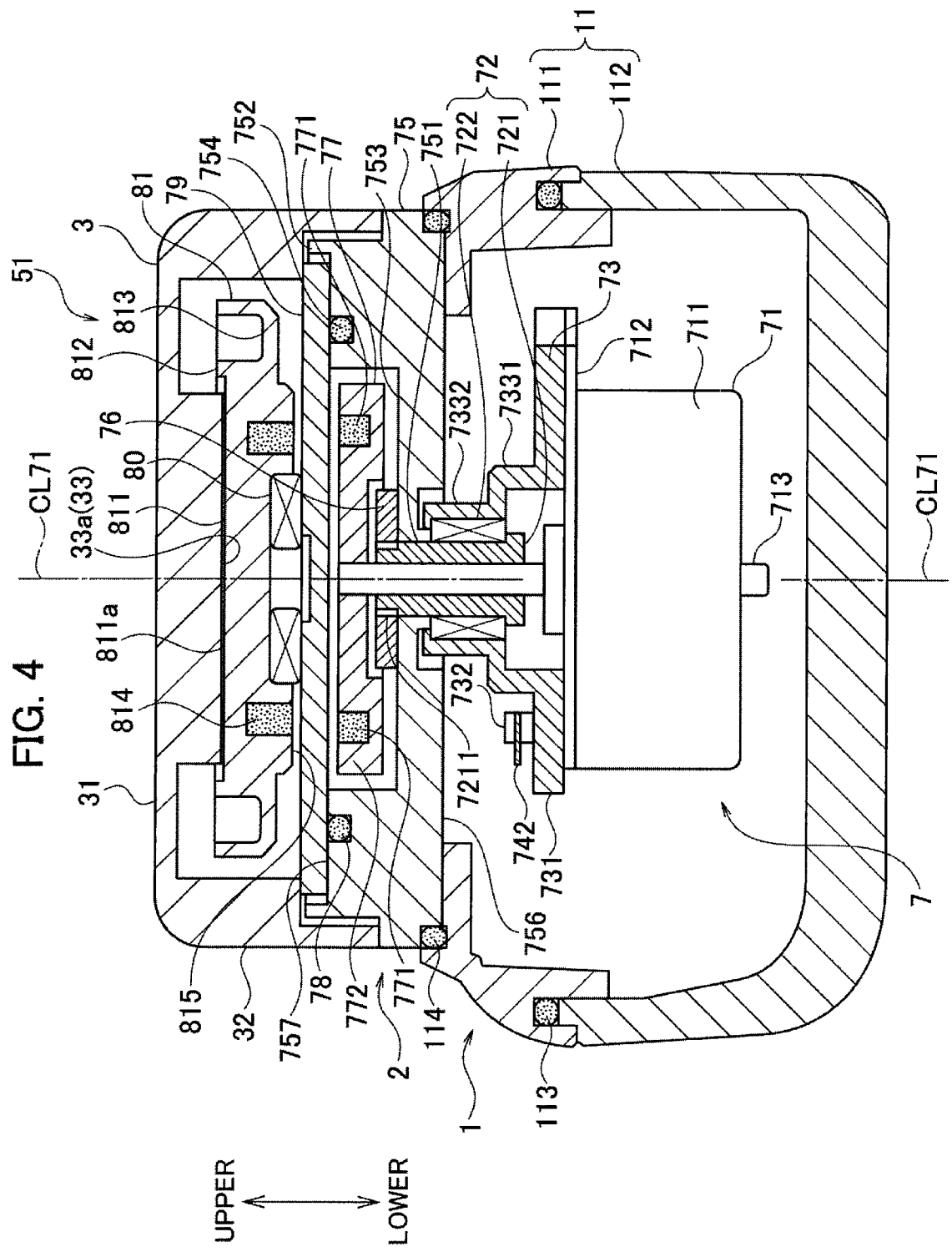
FIG. 4 is a cross-sectional view taken along S4-S4 in FIG. 1.
Figure 5:
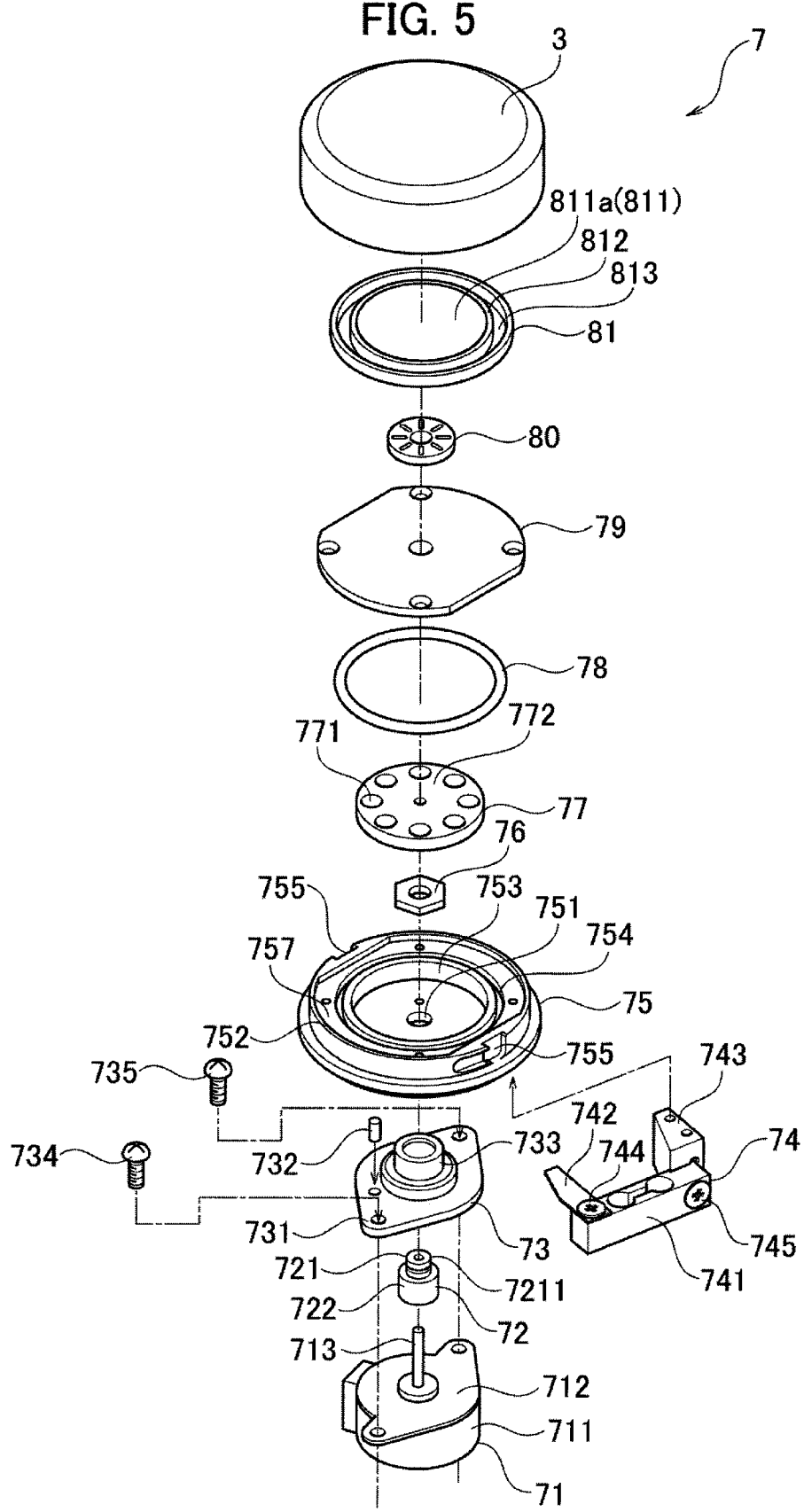
FIG. 5 is an assembly diagram of a viscosity measurement unit 7 included in the viscometer 51.

An example of a specific structure enabling the measurement of the viscosity in a short time is described in detail below mainly with reference to FIG. 4 and FIG. 5. FIG. 4 is a cross-sectional view taken along S4-S4 in FIG. 1. FIG. 4 is a lateral cross-sectional view of the stage 2, while illustrating a motor 71 in a side view. FIG. 5 is an assembly diagram of a viscosity measurement unit 7 illustrated in FIG. 4.

The configuration of the viscosity measurement unit 7 supported by the casing 11 is described in detail with reference to FIG. 4 and FIG. 5. The viscosity measurement unit 7 is also simply referred to below as a measurement unit 7. The measurement unit 7 includes the motor 71, a bearing unit 72, a motor mount 73, a base 75, and a strain gauge unit 74 listed from the lower side. The measurement unit 7 further includes a connection nut 76, a rotation plate 77, an O-ring 78, a waterproof plate 79, a thrust bearing 80, the measurement stage 81, and the measurement cap 3 each arranged over the base 75.

The motor 71 is a stepper motor, and includes a motor body 711, a shaft 713 as an output shaft, and a motor plate 712 that is a lid of the motor body 711 on the upper side. The bearing unit 72 includes a sleeve 721 and a radial bearing 722. The sleeve 721 has a cylindrical shape to which an inner ring (not shown) of the radial bearing 722 is fitted on the outer surface.

The sleeve 721 includes a male screw part 7211 provided with an external thread at the upper part. The motor mount 73 includes a plate-like mount base 731, a projection 733 projecting in the middle of the mount base 731 and having a diameter tapering off with two steps, and a mount pin 732 pressure inserted in the mount base 731 to project upward. The projection 733 includes a base-side projection 7331 and a tip-side projection 7332 having a smaller diameter than the base-side projection 7331.

Figure 6:
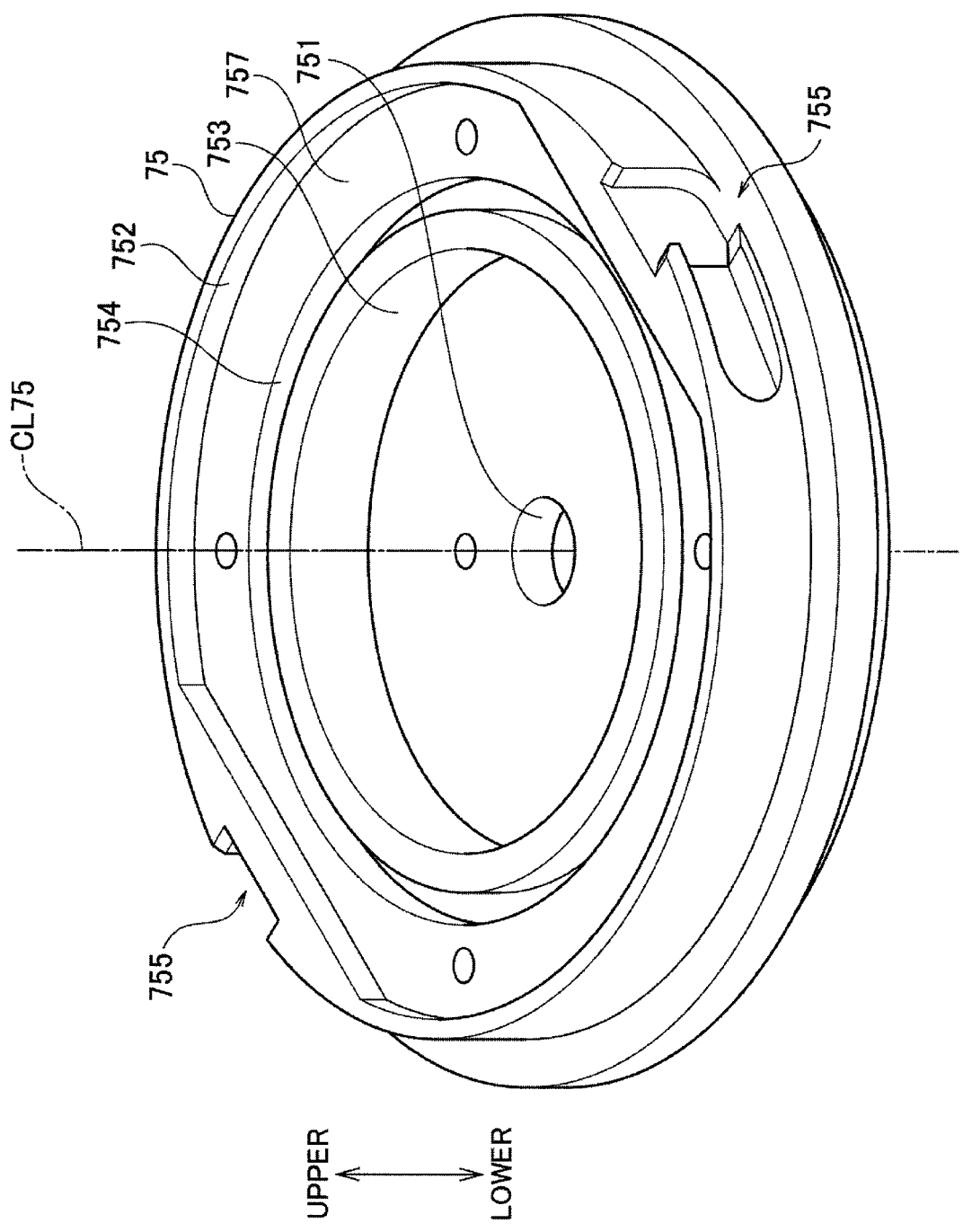
FIG. 6 is a perspective view of a base 75 included in the viscosity measurement unit 7.

The base 75 is described in detail with reference to FIG. 6 which is its perspective view. The base 75 has a disk-like shape having a penetration hole 751 about an axial line CL75 extending in the upper-lower direction as a center. The base 75 includes a reference surface 757, a circumferential rib 752, a recess 753, and a round groove 754. The reference surface 757 is a surface as a reference of the base 75 in the direction of the axial line CL75. The circumferential rib 752 projects upward along a circumferential edge of the reference surface 757. The recess 753 is recessed into a circle in the middle of the reference surface 757. The round groove 754 is provided on the reference surface 757. The base 75 also includes the cap engagement parts 755 described above provided on the outer circumferential surface of the circumferential wall and separated from each other by 180 degrees in the circumferential direction.

Figure 7:
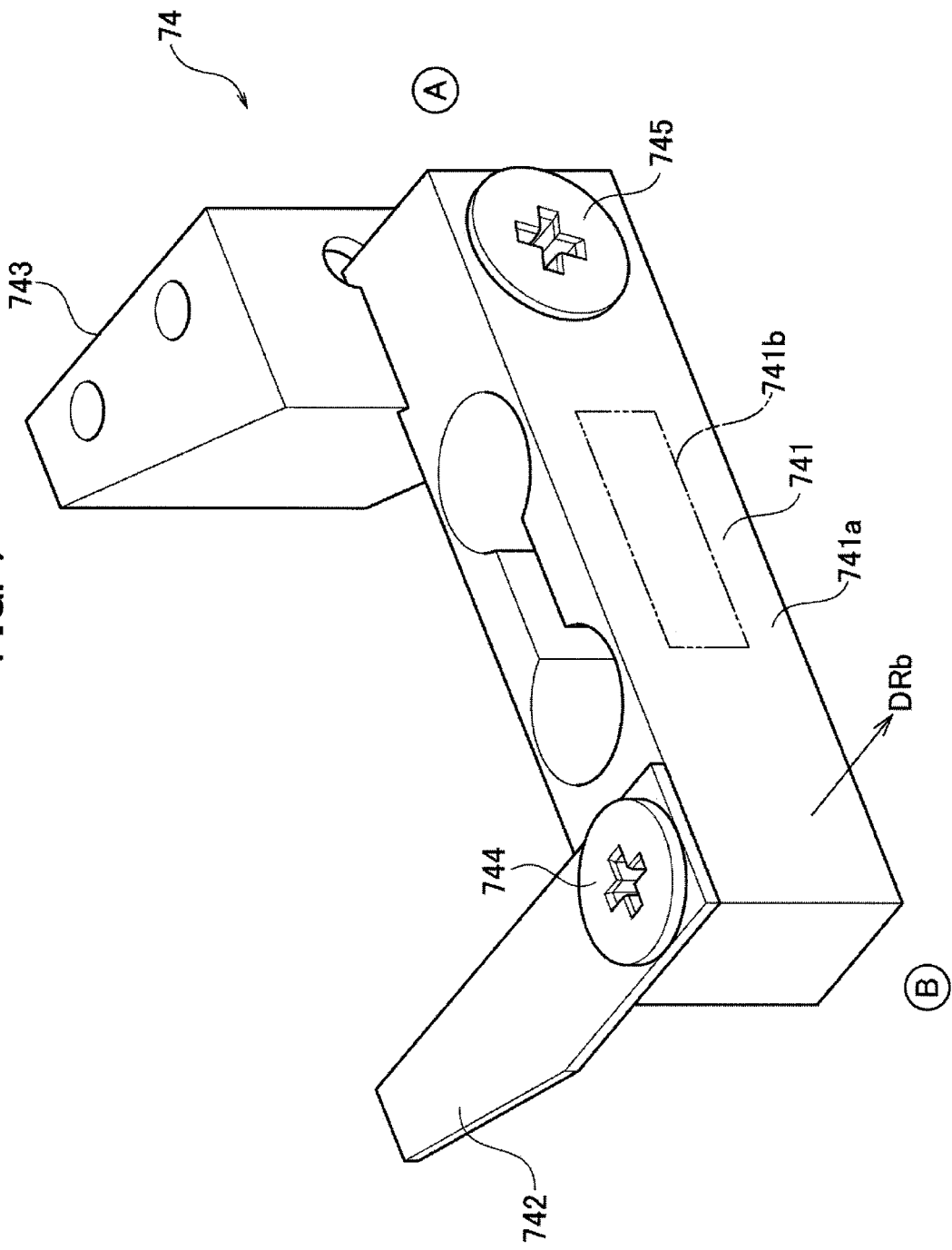
FIG. 7 is a perspective view of a strain gauge unit 74 included in the viscosity measurement unit 7.

The strain gauge unit 74 is described in detail with reference to FIG. 7 which is its perspective view. As illustrated in FIG. 7, the strain gauge unit 74 includes a gauge part 741, a cantilever 742, and a holder 743 which are unitized.

The gauge part 741 is composed of a beam load cell. The beam load cell used can be a commercially-available product. The gauge part 741 has a substantially rectangular parallelepiped elongated in the A-B direction in FIG. 7, and is provided with a strain gauge 741*b* stuck on a side surface 741*a*. The strain gauge unit 74 outputs by the strain gauge 741*b* a voltage corresponding to the amount of bending deformation in the direction indicated by the arrow DRb on the B-end side opposite to the A-end side. The gauge part 741 on the A-end side is fixed to the holder 743 with a screw 745. The cantilever 742 having a thin plate-like shape extending in the direction perpendicular to the elongated direction of the gauge part 741, is fixed to the B-end side of the gauge part 741 with a screw 744. The output voltage of the gauge part 741 is amplified by an amplifier 746 (refer to FIG. 2). The voltage amplified by the amplifier 746 is monitored by the controller 17 and is stored as necessary.

The assembled state of the plural members illustrated above is described in detail below mainly with reference to FIG. 4 and FIG. 5. The motor plate 712 of the motor 71 is fixed to the motor mount 73 with screws 734 and 735. The shaft 713 of the motor 71 is rotatably inserted to the sleeve 721 of the bearing unit 72. An outer ring (not shown) of the radial bearing 722 of the bearing unit 72 is pressure inserted and fixed to the inner surface of the tip-side projection 7332 of the projection 733 of the motor mount 73. The sleeve 721 of the bearing unit 72 is inserted to the penetration hole 751 of the base 75 from the lower side with the male screw part 7211 projecting upward. The connection nut 76 is fastened on the male screw part 7211 projecting upward so as to fix the bearing unit 72 to the base 75.

The motor 71 is thus supported, by the motor mount 73, rotatably about an axial line CL71 via the radial bearing 722. The shaft 713 of the motor 71 is also rotatable with respect to the motor mount 73.

Figure 8:
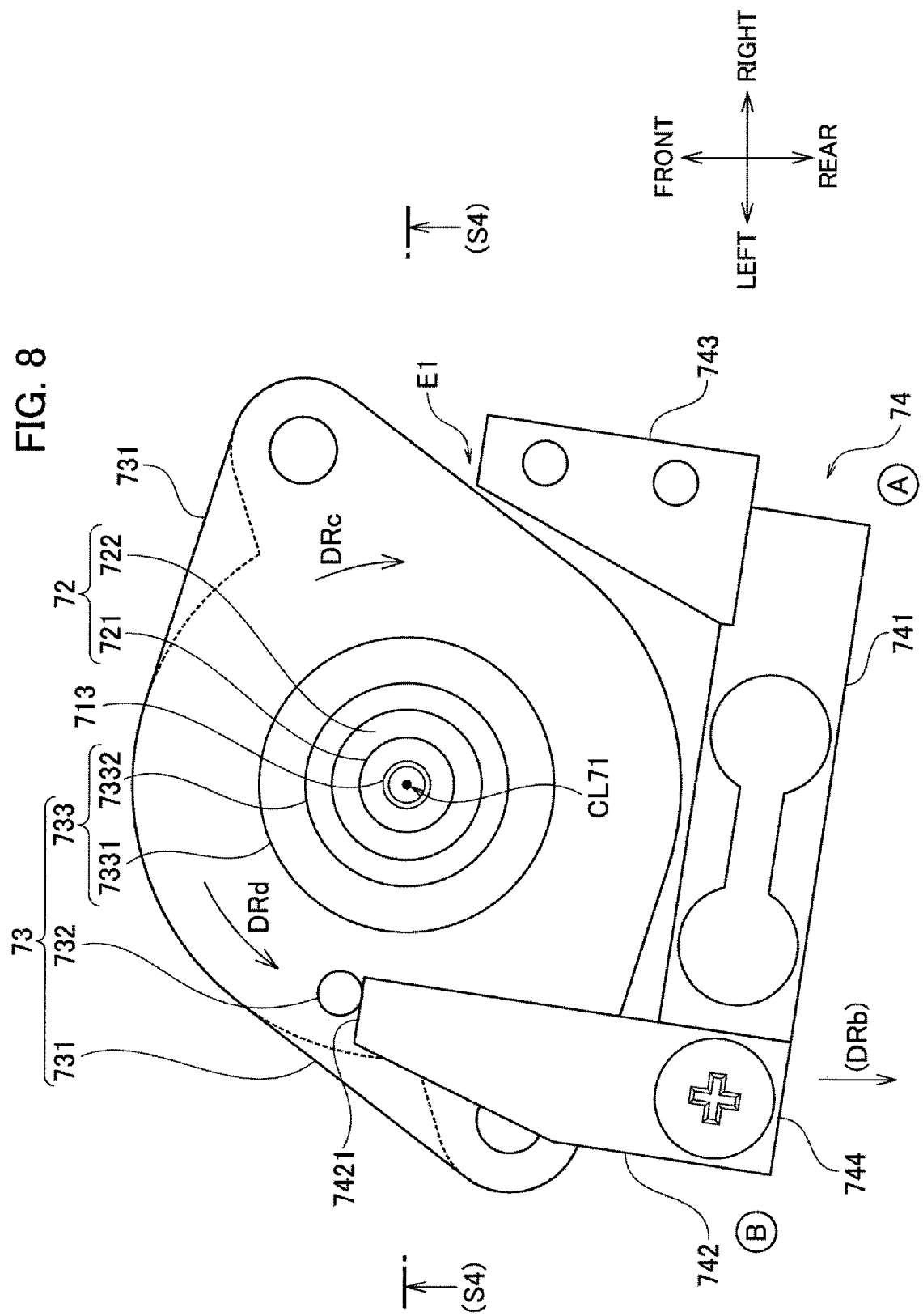
FIG. 8 is a front view for explaining an arrangement of the strain gauge unit 74.
Figure 9:
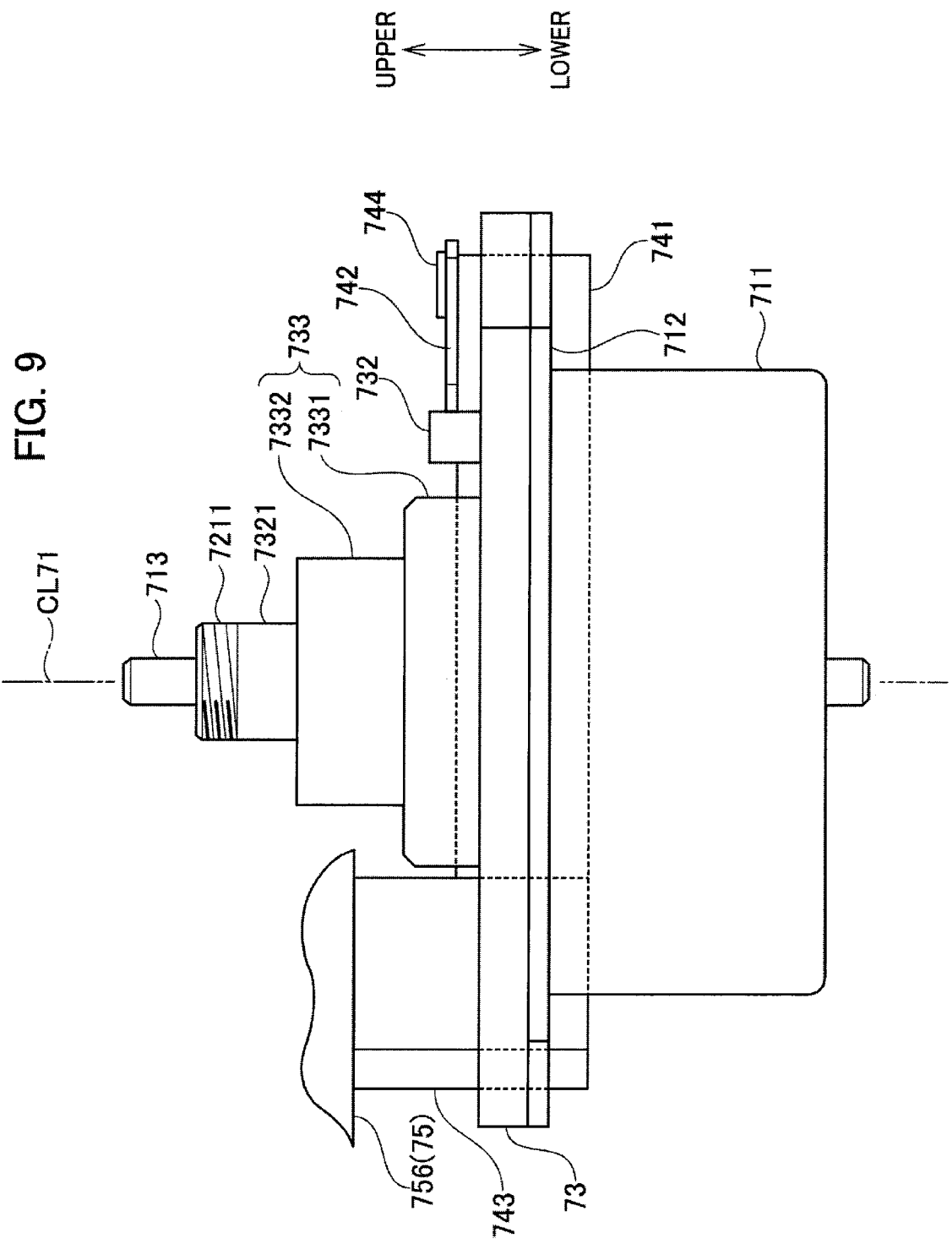
FIG. 9 is a top view of FIG. 8.

The holder 743 of the strain gauge unit 74 is fixed to a lower surface 756 of the base 75 in a predetermined attitude with screws (not shown). FIG. 8 and FIG. 9 are views for explaining the arranged position of the strain gauge unit 74 with respect to the motor 71 and the like. In particular, FIG. 8 is a top view illustrating an assembled state of the motor 71, the bearing unit 72, the motor mount 73, and the strain gauge unit 74. The position taken along (S4)-(S4) in FIG. 8 corresponds to the cross-sectioned position shown in FIG. 4. FIG. 9 is a front view of FIG. 8, also illustrating a part of the lower surface 756 of the base 75 in cross section to which the holder 743 of the strain gauge unit 74 is fixed.

As illustrated in FIG. 8, the rotations of the motor 71 rotatably supported by the base 75 about the axial line CL71 in regular and reverse directions are respectively restricted by the strain gauge unit 74 fixed to the base 75.

The rotation in the clockwise direction (indicated by the arrow DRc) in FIG. 8 is restricted such that the mount base 731 of the motor mount 73 is brought into contact with the holder 743 of the strain gauge unit 74 at the position E1. This restriction is caused due to the holder 743 that extends more downward than the position corresponding to the motor mount 73 from the base 75 in the direction of the axial line CL71 of the motor 71, as illustrated in FIG. 9.

The rotation in the counterclockwise direction (indicated by the arrow DRd) in FIG. 8 is restricted such that the mount pin 732 of the motor mount 73 is brought into contact with a tip 7421 of the cantilever 742 of the strain gauge unit 74. This restriction is caused due to the cantilever 742 that is arranged to be separated upward from the motor mount 73 in the direction of the axial line CL71 and only comes into contact with the mount pin 732, as shown in FIG. 9.

The contact of the motor mount 73 rotating in the clockwise direction with the holder 743 stops the rotation of the motor 71 with substantially no deformation of the holder 743. The contact of the mount pin 732 of the motor mount 73 rotating in the counterclockwise direction with the cantilever 742 further pushes the cantilever 742. The gauge portion 741 is then subjected to bending deformation with the B-end side displaced in the direction indicated by the arrow DRb and the A-end side as a fixed end. The gauge part 741 outputs a voltage corresponding to the amount of strain based on the deformation. The measurement unit 7 thus can obtain a rotational biasing force of the motor 71 in the counterclockwise direction (indicated by the arrow DRd) in accordance with the output voltage of the strain gauge unit 74.

The configuration of the measurement unit 7 on the lower side of the base 75 has been described above. The configuration of the measurement unit 7 on the upper side of the base 75 is described below with reference to FIG. 4 and FIG. 5.

The disk-shaped rotation plate 77 is coaxially fixed to the tip of the shaft 713 projecting upward from the sleeve 721. The rotation plate 77 is provided with a plurality of plate magnets 771 fitted along the circumferential edge at equal angular intervals at the same position in the radial direction with the same pole facing upward. The plate magnets 771 are herein fitted in the attitude in which the N-pole faces upward.

The rotation plate 77 is housed in the recess 753 of the base 75 such that the upper surface 772 of the rotation plate 77 is located at a level lower than the reference surface 757 of the base 75. The waterproof plate 79 is fixed to the reference surface 757 of the base 75 with screws (not shown) while pressing the O-ring 78 fitted to the round groove 754. In particular, the waterproof plate 79 pushes down the O-ring 78, which is housed in the round groove 754 while slightly projecting upward, so as to be tightly attached to the reference surface 757. The inner space of the recess 753 of the base 75 keeps its watertight state against the outside due to the waterproof plate 79 tightly attached to the reference surface 757 to push down the O-ring 78 and due to the screw engagement between the sleeve 721 and the connection nut 76.

The measurement stage 81 is rotatably mounted on the upper surface of the waterproof plate 79 via the thrust bearing 80. The measurement stage 81 has a disk-like shape to which the thrust bearing 80 is coaxially attached in the middle of the lower surface 815 of the measurement stage 81. A plurality of stage magnets 814 are fitted to the lower surface 815 of the measurement stage 81 to surround the thrust bearing 80.

The plural stage magnets 814 are arranged such that each substantially faces one of the plate magnets 771 of the rotation plate 77 at a particular rotational position. The respective stage magnets 814 are fitted to the measurement stage 81 in the attitude in which the magnetic pole on the side (the lower side) facing the plate magnets 771 is opposite to that of the plate magnets 771 so as to attract each other. When the plate magnets 771 are arranged in the attitude such that the magnetic pole on the upper side is the N-pole as described above, the stage magnets 814 are arranged in the attitude such that the magnetic pole on the lower side is the S-pole.

As described above, each of the stage magnets 814 is arranged to face the corresponding one of the plate magnets 771 so as to magnetically attract each other. The measurement stage 81 is thus automatically aligned and positioned on the waterproof plate 79 by the magnetic attraction about the axial line CL71 serving as an axis.

The measurement stage 81, which is not directly connected to the rotation plate 77, is automatically coaxially positioned so as to keep the magnetic balance with the rotation plate 77 in the radial direction. The measurement stage 81 is magnetically attracted to the rotation plate 77 and positioned by the thrust bearing 80 in the thrust direction. A frictional resistance in the rotating direction of the measurement stage 81 is substantially negligible due to the thrust bearing 80. The measurement stage 81 thus synchronously rotates substantially integrally with the rotation plate 77.

The upper surface of the measurement stage 81 is provided with the sample mount 811 described above having the sample mount surface 811a which is a slightly-recessed circular flat surface. The sample mount 811 has a circumferential groove 813 deeply hollowed along the entire circumference on the outer side in the radial direction. The part between the sample mount 811 and the circumferential groove 813 serves as a bank 812 relatively projecting upward along the entire circumference.

The sample mount surface 811a is opposed in parallel to a counter surface 33a of the cap stage 33 of the measurement cap 3 with a slight gap provided therebetween in the state in which the measurement cap 3 is attached to the stage 2. The sample mount surface 811a and the counter surface 33a are closely opposed to each other. The slight gap is set in a range of about 0.1 to 0.2 mm, for example. A system including the shaft 713, the rotation plate 77, and the measurement stage 81 in the measurement unit 7 is referred to as a rotation system Ra rotating relative to the motor body 711.

The measurement unit 7 described in detail above is attached to the casing 11 such that the base 75 is fixed with screws (not shown) to the upper case 111 with the O-ring 114 interposed therebetween, as illustrated in FIG. 4. The casing 11 includes the upper case 111 fixed to the lower case 112 with screws (not shown) with the O-ring 113 interposed therebetween. This structure keeps the inside of the casing 11 watertight from the external space. The measurement unit 7 is supported by the casing 11 such that only the base 75 is connected to the casing 11 but the other members excluding the base 75 are not in contact with the fixed member of the casing 11.

Next, the viscosity measurement operation of the viscometer 51 is described in detail below. A sample of which the viscosity P is measured is referred to as a sample Sm. As described above, the viscometer 51 with the measurement cap 3 removed is placed such that the sample mount surface 811a of the sample mount 811 horizontally faces upward. The sample Sm with the amount of about 0.3 ml, for example, is put on the sample mount surface 811a, and the measurement cap 3 is attached to the base 75. The controller 17 causes the display 12 to display the ambient temperature around the body 1 measured by the temperature sensor 14b. The controller 17 may compensate the temperature by a known method in accordance with the measured ambient temperature so as to obtain the viscosity P.

Figure 10:
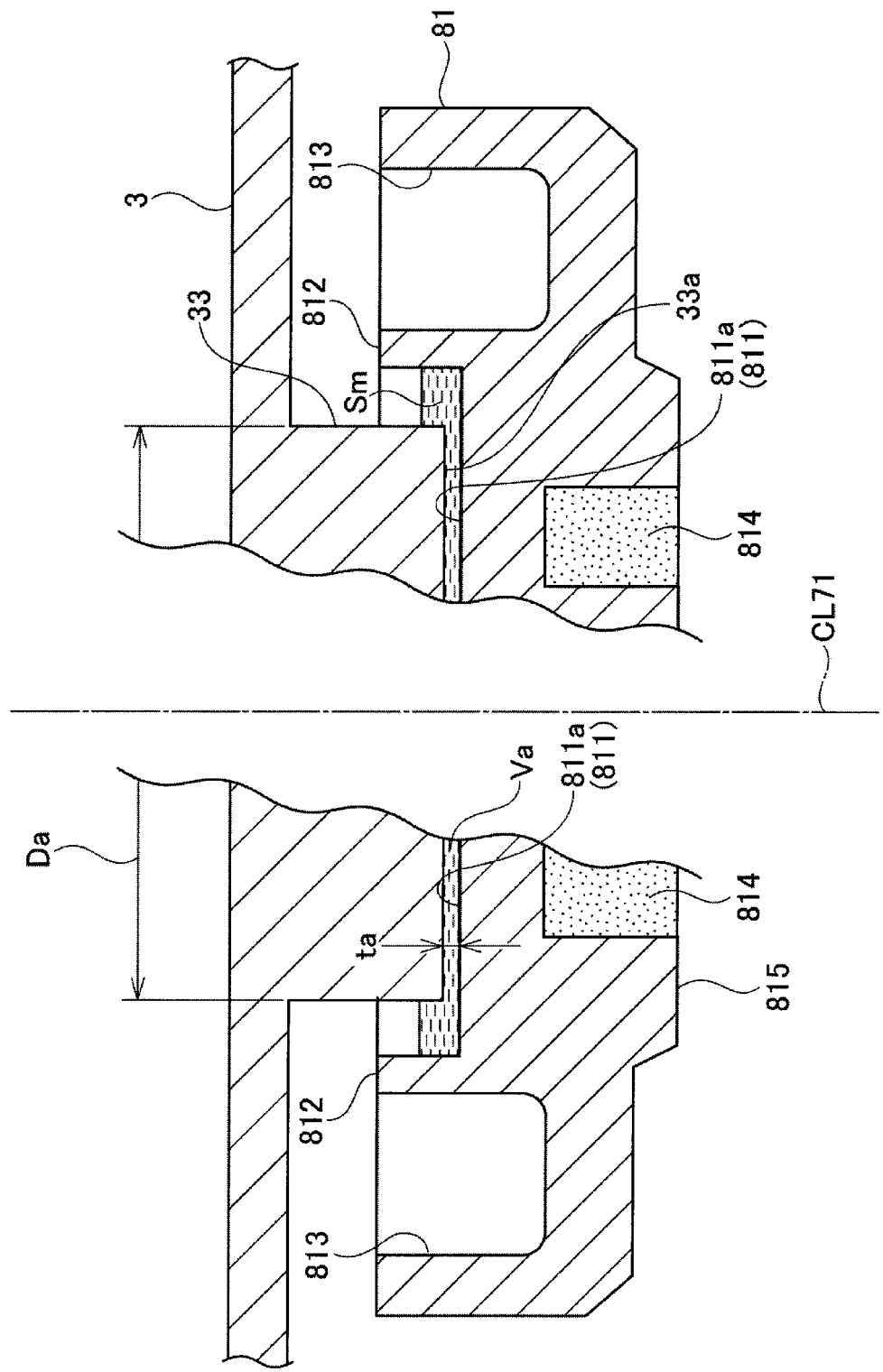
FIG. 10 is a partial cross-sectional view for explaining a sample filling space Va which is a gap between a cap stage 33 and a sample mount 811 in a partly-omitted state.

FIG. 10 is an enlarged cross-sectional view of a region in a partly-omitted state including a gap between the counter surface 33a of the cap stage 33 and the sample mount surface 811a of the sample mount 811 in a state in which the sample Sm is put on the sample mount surface 811a and in which the measurement cap 3 is attached to the base 75. Attaching the measurement cap 3 keeps the sample on the sample mount surface 811a spreading in the gap in the circular part at which the sample mount surface 811a is opposed to the counter surface 33a of the cap stage 33. The gap is a thin disk-shaped space having a diameter Da and a height ta. The diameter Da corresponds to a diameter of the cap stage 33 which is 25 mm, for example, and the height ta corresponds to a thickness of the gap in the direction of the axial line CL71 between the counter surface 33a of the cap stage 33 and the sample mount surface 811a of the sample mount 811 which is in a range of 0.1 to 0.2 mm, for example. The thin disk-shaped space in which the sample is entirely or partly filled and kept is referred to as a sample filling space Va.

A slightly extra amount of the sample Sm, if put on the sample mount surface 811a, is acceptable without leakage from the measurement stage 81, since part of the sample Sm spreading over the bank 812 is kept in the circumferential groove 813. There is thus less probability that the sample Sm impedes the rotation of the sensitive measurement stage 81 since the sample Sm does not leak from the circumferential edge of the measurement stage 81 to flow out onto the waterproof plate 79 unless an excessively large amount of the sample Sm is put on the sample mount surface 811a.

When the user pushes the measurement start button 13b after putting the suitable amount of the sample Sm on the sample mount 811 and attaching the measurement cap 3 to the base 75, the CPU 171 starts driving the motor 71. In particular, the CPU 171 starts driving the rotation system Ra including the shaft 713 with respect to the motor body 711 under a predetermined startup condition Pt. The startup condition Pt is preliminarily set such that the rotation system Ra reaches a steady-state rotation at a drive pulse speed of 5000 Hz within less than one second from the startup (for example, after about 0.8 seconds). The rotating direction of the shaft 713 with respect to the motor body 711 is the clockwise direction (indicated by the arrow DRc) in the top view in FIG. 8.

The startup condition Pt is preliminarily set for each type of the sample Sm, and is stored in the memory 172 while being linked with the corresponding sample Sm.

There is no external factor having an influence on the startup characteristics of the rotation system Ra in the non-measurement state in which the sample Sm is not present in the sample filling space Va, which ensures the stable startup characteristics with a high accuracy. The startup characteristics used herein are represented by time transition of the rotation rate of the rotation system Ra. In the measurement state in which the sample Sm is present in the sample filling space Va, the rotation system Ra does not start rotating until a torque applied thereto reaches a startup torque opposing a resistance which is caused due to a viscous stress of the sample Sm filled in the sample filling space Va. The motor body 711 then rotates in the counter-clockwise direction shown in FIG. 8 due to a reactive torque caused by the viscous resistance of the sample Sm and the stopped rotation of the rotation system Ra resulting therefrom. When the motor body 711 rotates in the counterclockwise direction, the mount pin 732 pushes the cantilever 742 to deform the strain gauge. The deformation resistance thereof increases the torque in the rotating direction applied to the rotation system Ra. When the torque in the rotating direction reaches the startup torque, the rotation system Ra starts rotating, and then keeps the rotation in the equilibrium state between the reactive torque Tqa corresponding to the viscosity of the sample Sm and the deformation resistance of the strain gauge.

After the time (the startup time) required for the torque in the rotating direction to reach the startup torque and start the rotation has elapsed since a rotation command time, the rotation system Ra rotates at a steady rotation rate in the equilibrium state in which the reactive torque Tqa applied in the direction impeding the rotation is constant.

In other words, the shaft 713 rotates in the clockwise direction (indicated by the arrow DRc) in FIG. 8 relative to the motor body 711 due to the startup command of the CPU 171. Along with this rotation, the rotation plate 77 fixed to the tip of the shaft 713, and the measurement stage 81 not connected mechanically but connected magnetically to the rotation plate 77 also rotate together. However, since the sample Sm is filled in the sample filling space Va, as described above, the rotation system Ra is caused to start rotating after the torque in the rotating direction, which is caused by the deformation resistance of the strain gauge against the pressure of the motor body 711, reaches the startup torque which corresponds to the viscosity of the sample Sm.

After the start of rotation of the rotation system Ra, the reactive torque Tqa in the direction impeding the rotation acts on the rotation system Ra. As described above, since the measurement unit 7 allows the motor body 711 to rotate with respect to the base 75 and the rotation system Ra, the motor body 711 rotates in the counterclockwise direction (indicated by the arrow DRd) in FIG. 8 due to the reactive torque Tqa, and pushes the cantilever 742 backward in FIG. 8 with the force corresponding to the magnitude of the reactive torque Tqa. The gauge part 741 is thus deformed backward (indicated by the arrow DRb) on the B-end side with respect to the A-end side as the fixed end and outputs the voltage corresponding to the amount of deformation.

Figure 11:
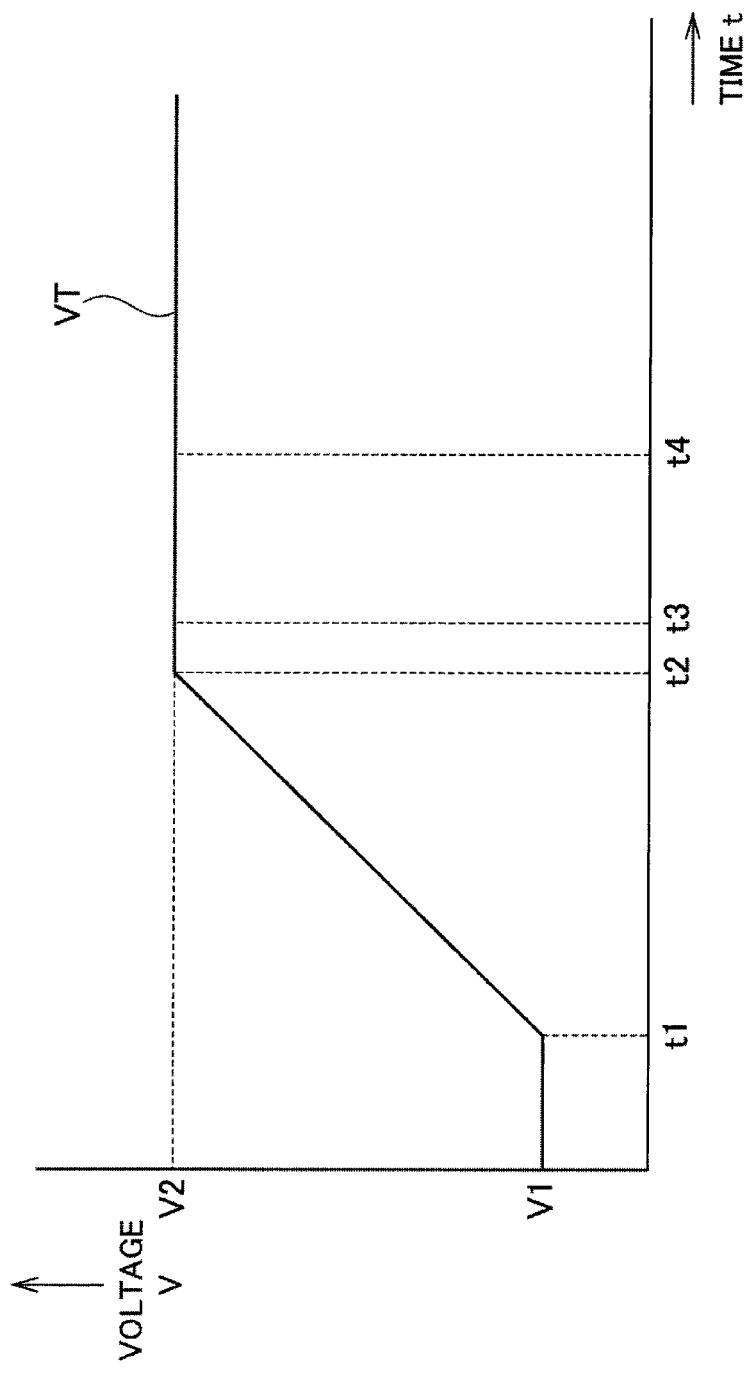
FIG. 11 is a graph for explaining time transition characteristics VT of an output voltage from the strain gauge unit 74 during a measurement operation of the viscometer 51.

FIG. 11 is a graph showing time transition characteristics VT of the output voltage V from the gauge part 741 in the startup operation of the rotation system Ra. The axis of ordinates of the graph indicates the output voltage V. The time transition characteristics VT show the voltage V1 in the original state in which the gauge part 741 has no strain, and show the voltage V2 during the steady-state rotation that is the equilibrium state where the strain is caused by the reactive torque Tqa applied after the startup. The axis of abscissas indicates the time t. The time t1 is the startup command time, and the time t2 is the rotation start time at which the torque in the rotating direction reaches the startup torque. The time t3 and the time t4 are the measurement start time and the measurement end time, respectively. The CPU 171 averages the output voltages V obtained from the time t3 to the time t4, and uses the average as a reference measurement voltage V2a for obtaining the viscosity P of the sample Sm.

As specific examples of the respective values, the voltage V1 is 0.610 V, and the voltage V2 is 1.630 V. When the time t1 is presumed to be zero seconds, the time t2 is 0.824 seconds, the time t3 is 1.00 seconds, and the time t4 is 1.30 seconds.

The memory 172 of the controller 17 is caused to link the type of the sample Sm with the corresponding startup condition Pt set for each type of the sample Sm, and stores the linked data. The startup condition is set such that several viscometer-correction reference liquids having different viscosities P are used as a sample, for example, and a startup pulse speed and a drive pulse speed are determined so that the startup time (the time t2–the time t1) of the time transition characteristics VT in FIG. 11 is less than one second for each viscosity.

A startup condition table TBa is then created in which the respective viscosities P, the startup conditions Pt each matched with the corresponding viscosity P, and the reference measurement voltages V2a which are obtained from the startups using the viscometer-correction reference liquids having different viscosities P as samples, are linked with each other. The startup condition table TBa created is stored in the memory 172.

The startup condition table TBa is preferably created for each type of sample. Examples of types of samples classified include a lubricant, cooking oil, cooking source, and paint. Creating the startup condition table TBa for each type of sample and obtaining a relationship between the viscosity P and the reference measurement voltage V2a enables to estimate the viscosity P with a higher accuracy, and to choose an appropriate processing method for estimating the viscosity P depending on whether the sample is a Newtonian fluid or non-Newtonian fluid.

FIG. 12 illustrates an example of the startup condition table TBa. The startup condition table TBa illustrated in FIG. 12 is an example of a table created such that the type of sample is a "lubricant A (Newtonian fluid)". This table indicates the respective startup conditions for measuring the samples having the viscosities P1 to Pn (n is an integer of two or greater) listed in ascending order, which are matched with the corresponding startup conditions Pt1 to Ptm (m is an integer of two or greater and n or smaller). The samples having the closer viscosities P can be measured under the same startup condition, such that the same startup condition Pt1 is assigned to the samples having the viscosities P1 to P3, while the startup condition Pt2 is assigned to the samples having the viscosity P4 and the followings listed below, for example, in the startup condition table TBa shown in FIG. 12. At least either the startup pulse speed or the drive pulse speed is increased for the sample having higher viscosity P, so as to adjust the startup time to less than a predetermined time (for example, less than one second).

The startup condition table TBa shown in FIG. 12 is set for each type of sample such that the each sample is linked with one of the reference measurement voltages V2a1 to V2an, each of which is obtained as a reference measurement voltage V2a by starting the driving the motor 71 under the startup conditions assigned to the samples having the different viscosities P1 to Pn.

The startup condition table TBa allows the recognition of the startup condition Pt and the reference measurement voltage V2a matched with the corresponding viscosity P. The startup condition table TBa also allows the recognition of the relationship of correspondence between the reference measurement voltage V2a and the viscosity P for each of the startup conditions Pt. Namely, the startup condition table TBa enables to estimate the viscosity P of a sample whose viscosity P is not known from the reference measurement voltage V2a obtained for that sample under one of the startup conditions Pt.

For the case of a sample of Newtonian fluid, the viscosity P and the reference measurement voltage V2a are substantially in proportional relationship. Thus, the viscosity P can be estimated with a high accuracy regardless of whether the number of data measured in advance is small. A relational expression Qa indicating the proportional relationship between the viscosity P and the reference measurement voltage V2a is preferably stored for each startup condition table TBa. For the case of a sample of non-Newtonian fluid, it is preferable to estimate an approximate curve according to plural pieces of data and store the relational expression Qb of the approximate curve in the memory 172.

An approximate value of the viscosity P of the sample in a liquid state can be typically estimated to some extent based on a resistance of stirring the sample put in a container. An example of a process of accurately measuring the viscosity P with the viscometer 51 is described below. The sample to be measured is presumed to be a sample Sm1 having viscosity P closer to the viscosity P4 shown in FIG. 12.

First, the measurer inputs the type of the sample Sm1 and the numerical value of the viscosity P4 close to the approximate estimated viscosity for the sample Sm1 via the operation unit 13 of the viscometer 51. The CPU 171 refers to, among the plural startup condition tables stored in the memory 172, the startup condition table TBa (which is herein the table shown in FIG. 12) corresponding to the "lubricant A (Newtonian fluid), which is the type of the sample input. The CPU 171 acquires the startup condition Pt2 corresponding to the viscosity P4 from the startup condition table TBa, and sets the startup condition Pt2 to be used for the subsequent measurement and stores it in the memory 172.

The measurer places the viscometer 51 on the horizontal surface with the bottom surface facing down. The measurer then puts a predetermined amount of the sample Sm1 on the sample mount part 811, attaches the measurement cap 3 to the base 75, and pushes the measurement start button 13b. The CPU 171 starts driving the rotation system Ra under the set startup condition Pt2 in response to the push of the measurement start button 13b, and stores the reference measurement voltage V2a acquired as a reference measurement voltage V2ay in the memory 172.

The CPU 171 compares the acquired reference measurement voltage V2ay with the reference measurement voltage V2a4 for the viscosity P4 acquired from the startup condition table TBa, substitutes the difference therebetween for the relational expression Qa to obtain the viscosity of the sample Sm1, and displays the viscosity on the display 12 while storing it in the memory 172. The time from which the CPU 171 acquires the reference measurement voltage V2a1 to which the CPU 171 displays the viscosity of the sample Sm1 on the display 12 is quite short, and is about one second after the push of the measurement start button 13b.

As described above, the viscometer 51 includes a first stage (the cap stage 33) as a fixed member having a first circular flat surface (the counter surface 33a). The viscometer 51 also includes a second stage (the measurement stage 81) as a rotation member having a second circular flat surface (the sample mount surface 811a) arranged to be opposed in parallel to the first circular flat surface (the counter surface 33a) with a slight gap provided therebetween. The slight gap is the sample filling space Va. The viscometer 51 also includes the motor 71 including the shaft 713 directly or indirectly connected to the measurement stage 81 to rotate synchronously and the motor body 711 rotatably supported by the base 75 as a fixed member. The viscometer 51 also includes the strain gauge unit 74 including the cantilever 742 biased by the rotation of the motor body 711 in a first direction (indicated by the arrow DRd). The viscometer 51 further includes the controller 17 including the memory 172 that stores the startup condition table TBa and the CPU 171 that controls the operation of the motor 71. The controller 17 recognizes the reference measurement voltage V2a output in accordance with the amount of deformation of the strain gauge unit 74 caused by the biased cantilever 742, and refers to the startup condition table TBa to obtain the viscosity P corresponding to the reference measurement voltage V2a.

When the controller 17 starts driving the rotation system Ra including the shaft 713 and the measurement stage 81 in a second direction opposite to the first direction in the state in which the sample is filled in the sample filling space Va, the motor body 711 rotates in the first direction due to the resistance caused by the viscous stress of the sample. The motor body 711 then comes into contact with the cantilever 742 at the reactive torque Tqa corresponding to the viscous resistance, and further biases the cantilever 742 in the first direction after the rotation system Ra reaches the steady-state rotation. The controller 17 obtains the viscosity P of the sample based on the reference measurement voltage V2a immediately after the rotation system Ra reaches the steady-state rotation. Since the startup time until the rotation system Ra reaches the steady-state rotation can be set to a short period such as less than one second, the viscometer 51 can measure the viscosity P in a short time. In addition, since the measurement time is short, the increase in temperature of the sample can be reduced to a negligible level, thus enabling to measure the viscosity P with a high accuracy.

The viscometer 51, which can measure the viscosity with a quite small amount of the sample, has flexibility as to the measurement location. In addition, the viscometer 51 is easy to clean after the measurement since the counter surface 33a and the sample mount surface 811a are flat and have a relatively small area. The viscometer 51 is thus easy to handle.

While the viscometer 51 is illustrated above with a portable hand-held type including the body 1 which is holdable, the viscometer 51 may be a stationary type used such that the body 1 when measuring is placed on a table or a shelf. The type of the casing 11 to which the measurement unit 7 is installed may be determined as appropriate.

Figure 13:
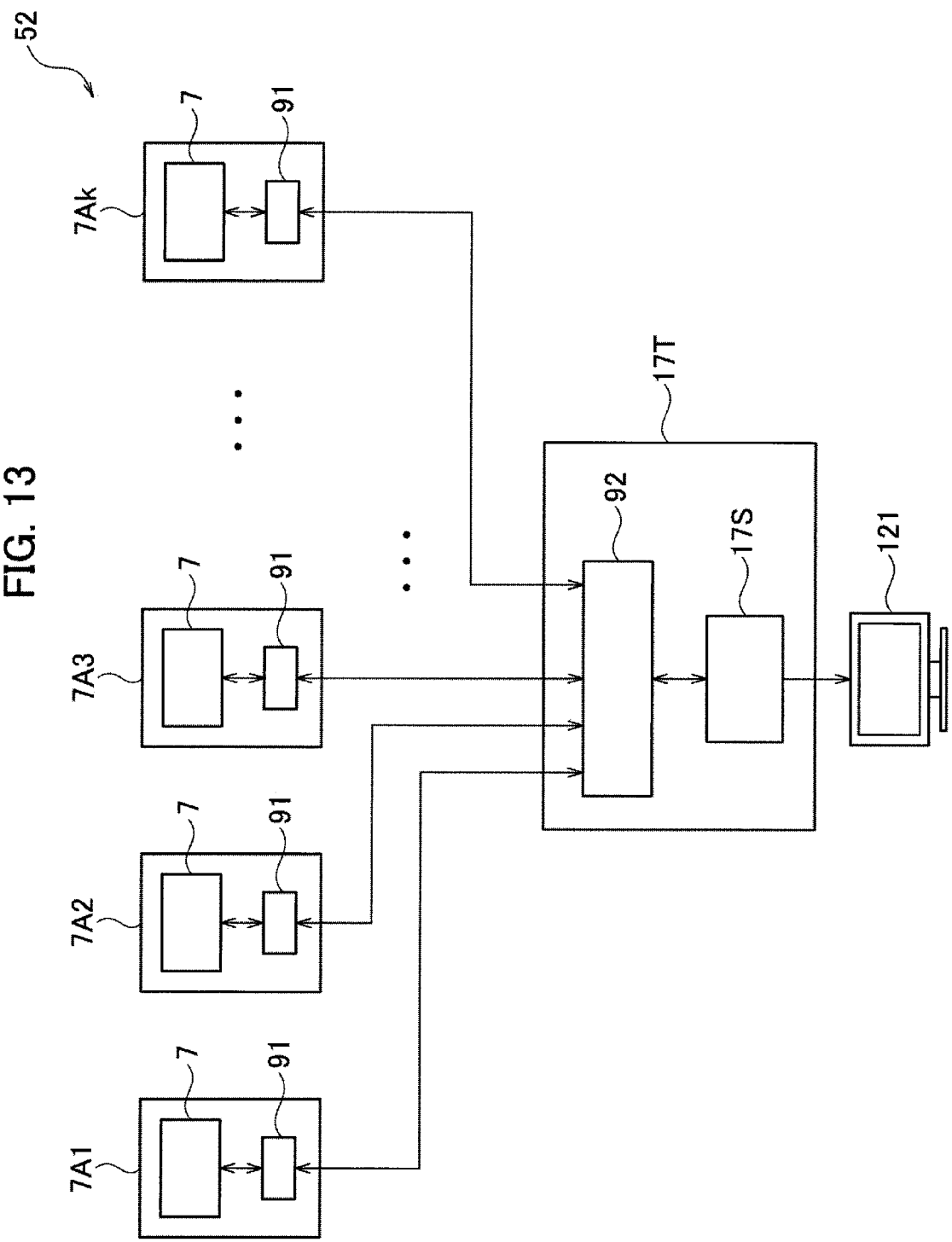
FIG. 13 is a configuration diagram illustrating a viscosity measurement system according to one or more embodiments.

Regardless of whether the viscometer 51 is the hand-held type or the stationary type, the measurement unit 7 and the controller 17 may be separated and each provided with a communication unit to implement a system so as to communicate with each other in either a wireless or wired manner, as illustrated in FIG. 13.

FIG. 13 is a diagram showing a configuration example of a viscosity measurement system 52 including a plurality of viscosity measurement units 7A1 to 7Ak arranged in the k-number lines (k is an integer of two or greater) for producing samples, and an integrated control device 17T which communicates with the respective viscosity measurement units 7A1 to 7Ak in either a wireless or wired manner. The viscosity measurement units 7A1 to 7Ak each include the viscosity measurement unit 7 and a measurement-side communication unit 91. The integrated control device 17T includes a control-side communication unit 92 and an integrated controller 17S. The integrated controller 17S can simultaneously control the respective viscosity measurement units 7A1 to 7Ak in the same manner as the controller 17 of the viscometer 51 that controls the single viscosity measurement unit 7. The integrated controller 17S displays the information of the respective viscosity measurement units 7A1 to 7Ak on an integrated display 121.

The respective viscosity measurement units 7A1 to 7Ak are preferably capable of automatically attaching and removing of the measurement cap 3, putting the sample on the sample mount 811, and executing the viscosity measurement including the cleaning of the measurement cap 3 and the sample mount 811 after the measurement. This automatic operation can take full advantage of the functions of the viscometer 51 that can measure the viscosity with a high accuracy in a short time, so as to efficiently produce samples with high quality and less variation in viscosity.

The motor 71 is not limited to the stepper motor, and may be a DC motor or an AC motor instead. The stepper motor, however, has the advantage of enabling the repeated startup under the respective startup conditions Pt with a high accuracy and stability.

The pair of the opposed surfaces to define the sample filling space Va is not limited to the pair of the counter surface 33a and the sample mount surface 811a as described above that are the flat surfaces parallel to each other. The paired surfaces may be a convex cone and a concave cone opposed to each other, or may be a convex curved surface and a concave curved surface opposed to each other.

The configuration of connection between the shaft 713 of the motor 71 and the rotation plate 77 is not limited to the indirect connection by the magnetic attraction to rotate synchronously as described above, and may be a direct or mechanical connection so as to rotate synchronously.

The base 75 may rotatably support the shaft 713 and also rotatably support the motor body 711 via the shaft 713. The base 75 may rotatably support the motor body 711 and also rotatably support the shaft 713 via the motor body 711. Alternatively, the motor body 711 and the shaft 713 may be rotatably supported individually by the base 75.

The controller 17 and the integrated controller 17S are each a multi-purpose microcomputer, for example. A computer program may be installed on each of the controller 17 and the integrated controller 17S. The controller 17 and the integrated controller 17S can exert the functions described above when the computer program is executed. A processing circuit implementing the functions of each of the controller 17 and the integrated controller 17S may include a device such as a programmed processor, an electrical circuit, and an application-specific integrated circuit (ASIC), or further include circuit constituent elements arranged to execute the described functions. The display 12 and the integrated display 121 may be a liquid crystal display (LCD), an organic electro-luminescence (EL) display, or an inorganic EL display.

All of the constituent elements in the respective embodiments described above and all features recited in the appended claims may be separately extracted and combined together as long as the elements in each combination are not contradictory to each other.

While the present disclosure has been described above by reference to some embodiments, it should be understood that the respective embodiments are referred to only for illustration purposes to facilitate the understanding of the present disclosure. The technical scope of the present disclosure is not intended to be limited to the specific technical matters disclosed in the respective embodiments, but includes various variations, modifications, and alternative techniques that can be easily led from the disclosure.

This application is based upon and claims the benefit of priority from Japanese Patent Application No. 2018-131568 filed on Jul. 11, 2018, the entire contents of which are incorporated herein by reference.

REFERENCE SIGNS LIST

1 BODY
1a TOP SURFACE
11 CASING
111 UPPER CASE
112 LOWER CASE
113, 114 O-RING
12 DISPLAY
12a DISPLAY ELEMENT
121 INTEGRATED DISPLAY
13 OPERATION PART
13a POWER SUPPLY BUTTON
13b MEASUREMENT START BUTTON
14 TEMPERATURE DETECTION PART
14a PORT
14b TEMPERATURE SENSOR
15 BATTERY HOUSING PART
15a CAP
16 BOARD
17 CONTROLLER
17S INTEGRATED CONTROLLER
17T INTEGRATED CONTROL DEVICE
171 CENTRAL PROCESSING UNIT (CPU)
172 MEMORY
2 STAGE
3 MEASUREMENT CAP
31 FLAT BOTTOM
32 CIRCUMFERENTIAL WALL
33 CAP STAGE
33a COUNTER SURFACE
51 VISCOMETER
52 VISCOSITY MEASUREMENT SYSTEM
7, 7A1 to 7Ak MEASUREMENT UNIT (VISCOSITY MEASUREMENT UNIT)
71 MOTOR
711 MOTOR BODY
712 MOTOR PLATE
713 SHAFT
72 BEARING UNIT
721 SLEEVE
7211 MALE SCREW PART
722 RADIAL BEARING
73 MOTOR MOUNT
731 MOUNT BASE
732 MOUNT PIN
733 PROJECTION
7331 BASE-SIDE PROJECTION
7332 TIP-SIDE PROJECTION
734, 735 SCREW
74 STRAIN GAUGE UNIT
741 GAUGE PART
741a SIDE SURFACE
741b STRAIN GAUGE
742 CANTILEVER

7421 TIP
743 HOLDER
744, 745 SCREW
746 AMPLIFIER
75 BASE
751 PENETRATION HOLE
752 CIRCUMFERENTIAL RIB
753 RECESS
754 ROUND GROOVE
755 CAP ENGAGEMENT PART
756 LOWER SURFACE
757 REFERENCE SURFACE
76 CONNECTION NUT
77 ROTATION PLATE
771 PLATE MAGNET
772 UPPER SURFACE
78 O-RING
79 WATERPROOF PLATE
80 THRUST BEARING
81 MEASUREMENT STAGE
811 SAMPLE MOUNT
811a SAMPLE MOUNT SURFACE
812 BANK
813 CIRCUMFERENTIAL GROOVE
814 STAGE MAGNET
815 LOWER SURFACE
91 MEASUREMENT-SIDE COMMUNICATION UNIT
92 CONTROL-SIDE COMMUNICATION UNIT
BT BATTERY
CL71, CL75 AXIAL LINE
Da DIAMETER
E1 POSITION
Pt, Pt1 to Ptm STARTUP CONDITION
P, P1 to Pn VISCOSITY
Qa, Qb RELATIONAL EXPRESSION
Ra ROTATION SYSTEM
Sm, Sm1 SAMPLE
TBa STARTUP CONDITION TABLE
ta HEIGHT
Tqa REACTIVE TORQUE
t1 to t4 TIME
Va SAMPLE FILLING SPACE
VT TIME TRANSITION CHARACTERISTIC
V OUTPUT VOLTAGE
V1, V2 VOLTAGE
V2a, V2a1 to V2an, V2ay REFERENCE MEASUREMENT VOLTAGE

The invention claimed is:

1. A viscosity measurement unit comprising:
a first stage having a first surface;
a second stage having a second surface and configured to rotate the second surface with the second surface being opposed and in proximity to the first surface;
a motor including a motor body and a shaft that is an output shaft of the motor body and configured to rotate synchronously with the second stage;
a fixed member arranged to rotatably support the shaft and the motor body;
a strain gauge unit fixed to the fixed member and configured to be biased by a contact of the motor body when the motor body rotates in a first direction with respect to the fixed member;
a controller configured to control an operation of the motor and obtain viscosity in accordance with an output voltage from the strain gauge unit;
a casing provided to support the fixed member and house the controller; and
a cap removably attached to the fixed member to cover the second surface in an attached state and cause the second surface to be exposed in a removed state,
wherein the shaft is directly or indirectly connected to the second stage to rotate synchronously with the second stage.

2. The viscometer according to claim 1, wherein the casing is holdable.

3. The viscometer according to claim 1, further comprising a memory configured to store a relationship of correspondence between the output voltage and the viscosity,
wherein, the controller configured to, in response to a startup command being externally input in a state in which a sample of which the viscosity is measured is held between the first surface and the second surface, start driving the motor to rotate in a second direction opposite to the first direction, detect the output voltage from the strain gauge unit obtained in a state in which the motor body rotates in the first direction due to reactive torque derived from viscosity of the sample and comes into contact to bias the strain gauge unit, and obtain the viscosity corresponding to the detected output voltage in accordance with the relationship of correspondence.

* * * * *